Sept. 26, 1944.  W. T. ROSSELL ET AL  2,359,246

VEHICLE ANTI-GLARE AND VENTILATING DEVICE

Filed Aug. 3, 1940  2 Sheets-Sheet 1

Sept. 26, 1944.  W. T. ROSSELL ET AL  2,359,246
VEHICLE ANTI-GLARE AND VENTILATING DEVICE
Filed Aug. 3, 1940  2 Sheets-Sheet 2
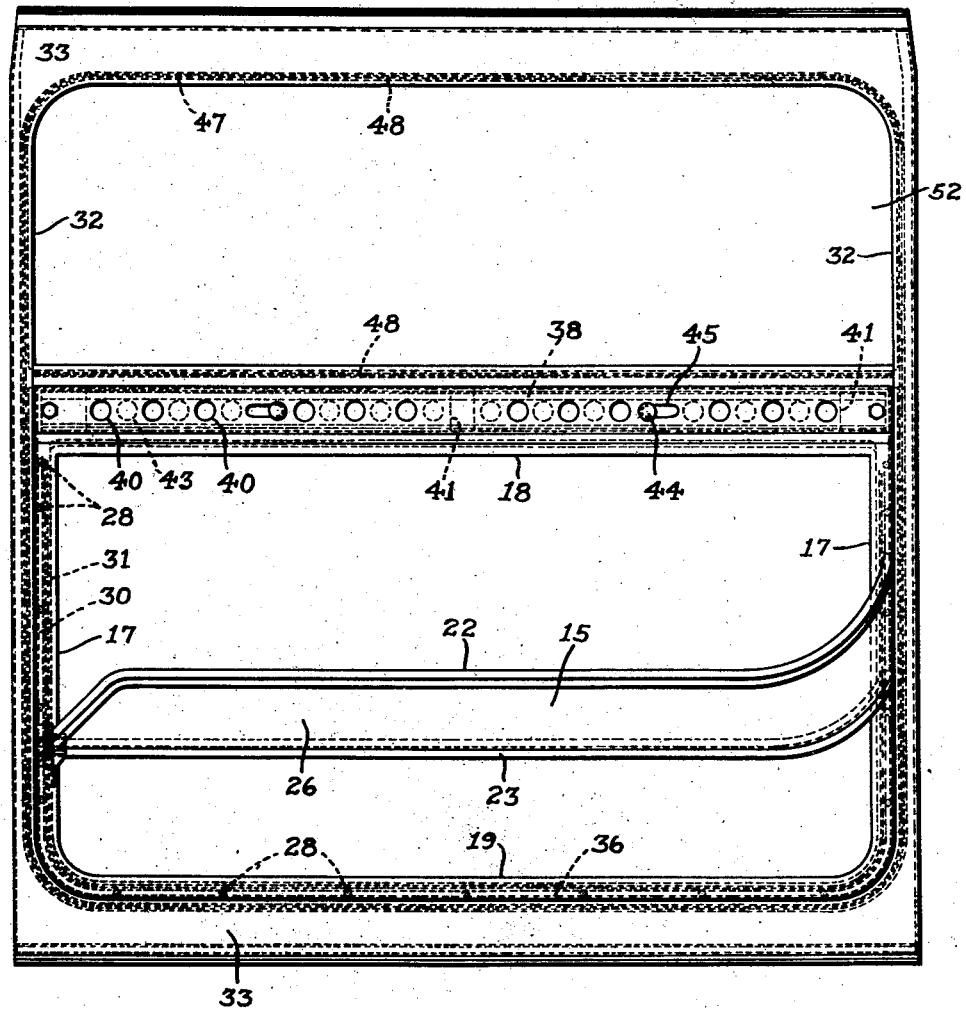
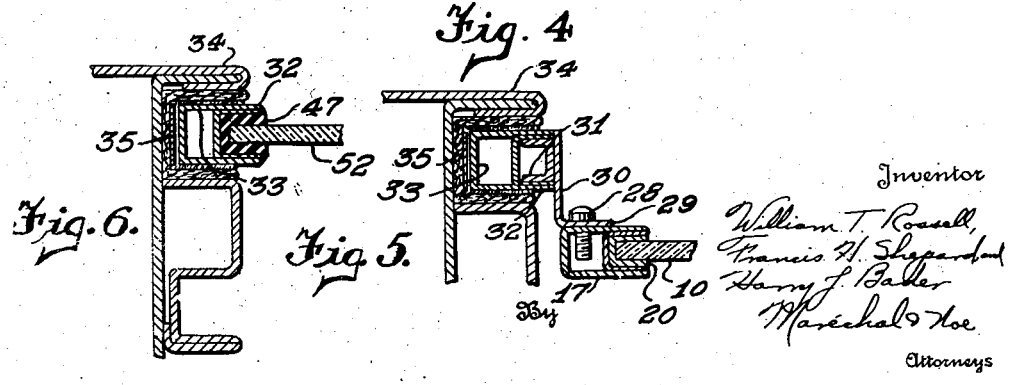

Patented Sept. 26, 1944

2,359,246

UNITED STATES PATENT OFFICE 2,359,246

VEHICLE ANTIGLARE AND VENTILATING DEVICE

William T. Rossell, University City, Mo., Francis H. Shepard, New Rochelle, N. Y., and Harry J. Bader, Troy, Ohio, assignors to St. Louis Public Service Company, St. Louis, Mo., a corporation of Missouri Application August 3, 1940, Serial No. 350,992

17 Claims. (Cl. 296—97)

This invention relates to vehicles and more particularly to vehicle windows.

One object of the invention is the provision of a vehicle side window having an upper portion which extends upwardly and inwardly and provides vision from the driver's location in a lateral direction, and a light shield in cooperative association with the window and of such form and inclination as to prevent glare or light reflection into the driver's eyes from the useful vision area of the window glass.

Another object is the provision, in a vehicle, of a side window arranged below a destination sign of the vehicle and curving upwardly and inwardly with a gradually increasing curvature, in combination with a light shield of such form as to prevent reflection of light into the driver's eyes from the useful vision area as the driver glances through the window in a rearward lateral direction.

Another object is the provision, in a vehicle, of a side window which extends upwardly and inwardly at its upper portion, and a holder by which the window is supported from a sash member in an inwardly offset relation.

Another object is the provision, in a vehicle, of a side window extending upwardly and inwardly and providing driver vision in a rearward lateral direction, and a holder supporting the window from a sash member in an inward offset relation, the holder having ventilating openings through which an upwardly directed current of air may enter the vehicle at a zone displaced a substantial distance inwardly from the window frame.

Other objects and advantages of the invention will be apparent from the following description, the appended claims and the accompanying drawings.

In the drawings,

Fig. 4 is a side view of the window, looking outwardly and with the destination sign omitted;

Fig. 5 is a horizontal section on the line 5—5 of Fig. 3 and showing the relation of the sash member to the window frame; and Fig. 6 is a horizontal section on the line 6—6 of Fig. 3 also showing the relation of the sash member to the window frame.

Figures 1, 3:
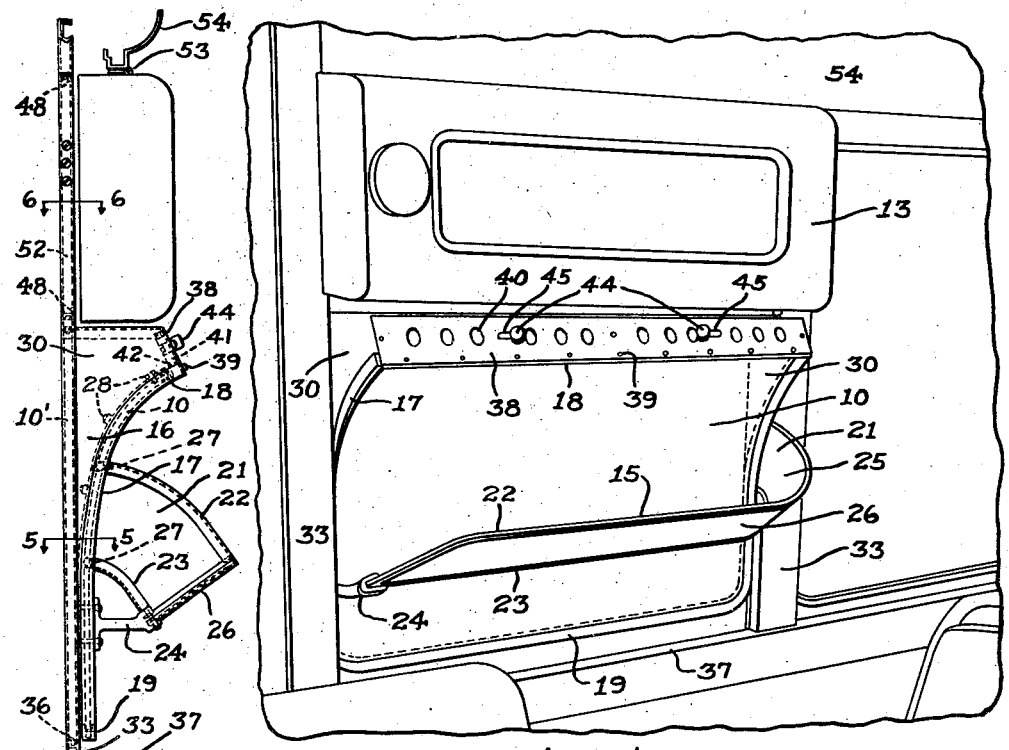
Fig. 1 is a perspective view of a vehicle side window embodying the present invention.
Fig. 3 is an end view of the window sash and its associated parts.
Figure 2:
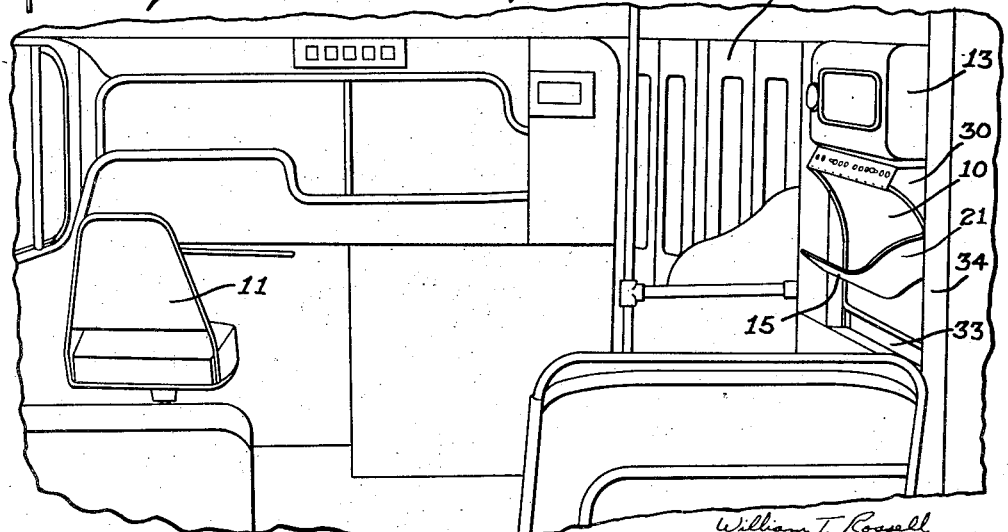
Fig. 2 is a perspective view of the forward portion of the vehicle showing the relationship between the side window and the driver's position.

In the drawings in which the same parts have been designated by the same reference numerals in the several views, the preferred form of the invention is shown embodied in a side window of a street car or bus, the window having a pane 10, shown in Fig. 1, arranged at the right-hand side of the vehicle somewhat to the rear of the driver's seat 11 so that the driver, while in his normal position, can glance in a generally lateral and rearward direction through the window, as in making or about to make a right-hand turn, to see if another vehicle happens to be on his right. As shown, the window 10' is adjacent the door 12 through which the passengers may enter or leave, and is arranged below a destination sign 13 which faces out laterally to indicate the destination to people waiting for the vehicle.

As the driver turns his head and looks to the right in a generally rearward direction through a side window of a vehicle of the usual construction, having a brightly illuminated interior, he sees reflections of objects inside the vehicle, and these reflections of light colored objects, moving newspapers or parts worn by or held by passengers inside the vehicle may be so bright and clear, in night driving, as to be more distinct to the driver than the objects outside the vehicle which he wishes to see, and result in considerable confusion to the driver. In accordance with the present invention, however, the glass pane 10 through which the driver has a normal useful vision at a lateral rearward angle extends upwardly and inwardly and has associated with it a light shield 15 which is so arranged as to block from the window all light rays that would strike the useful vision area of the pane in such a direction as to reflect into the eyes of the driver. This normal useful vision of the pane is above the level of the bottom of the light shield, the light shield being inclined upwardly and inwardly generally towards the driver's eyes or to some point somewhat above his eyes when he is in his normal position in the seat 11, so that the light shield, while effective in preventing objectionable glare or reflections to the driver from all parts of the pane 10 above the level of the bottom of the light shield does not produce any considerable reduction in the area of the window through which the driver can see.

The window pane 10 is mounted in a holder 16 having upwardly extending channels 17 and upper and lower horizontally extending channels 18 and 19 which receive the edges of the glass, with a sealing channel strip 20 interposed between the glass and the holder as shown in Fig. 5. The glass and the channels 17 are curved upwardly and inwardly, with an upwardly increasing curvature so that the bottom portion of the window pane extends approximately vertically, with the upper portions of the pane inclined at a considerable angle, see Fig. 3. The angle of inclination or curvature of this upper portion of the pane is so coordinated with the inward extent and slope of the light shield 15, which has a non-reflecting upper surface, that all light rays striking the pane 10 above the level of the bottom of the light shield cannot reflect into the driver's eyes. Such light rays will either reflect in some direction so as not to meet the driver's eyes, or will be reflected down against the upper light absorbing surface of the light shield. Thus any light rays extending generally horizontally towards the upper portion of the pane will reflect down and strike the light shield, and those light rays traveling in a generally horizontal direction toward the lower portion of the pane, or traveling upwardly toward the pane will be blocked off by the light shield before reaching the pane. The portion 21 of the light shield adjacent the rear end of the pane extends upwardly and generally laterally towards the rear edge of the pane, this portion of the light shield having a gradual upward sweep and extending to the rear channel 17 in which the pane is mounted, being effective in blocking from the useful vision area of the pane 10 those light rays which may be directed forwardly towards the portion of the pane adjacent its middle portion.

The light shield is preferably constructed of a peripheral frame of channeled sheet metal including the upper and lower channels 22 and 23 connected together and to a supporting bracket 24 at their forward ends, and extending generally horizontally and then sweeping upwardly to provide the end portion 21 of the light shield. Suitable bolts 27 fasten the rear terminal portions of the channels 22 and 23 to the upwardly extending channel 17 in which the pane is mounted. Carried by the channels 22 and 23 is a strip 25 of black mohair or other suitable non-reflecting material, overlying and cemented to a sheet metal back plate 26 which is supported by the lower legs of the channels 22 and 23. As will be noted from Fig. 3, the lower edge of the light shield is spaced a substantial distance of a few inches inwardly from the pane 10 to permit vision of the car occupants through the bottom portion of the pane.

The channels 17, 18 and 19 in which the glass pane 10 is carried are held by fastening screws 28 to the inwardly directed flanges 29 of sheet metal side plates 30. Each side plate 30 is welded to a straight sheet metal channel 31, see Fig. 5, these channels projecting laterally into the vertically extending window channels 32 of a sash member 33 which is arranged in the window frame grooves provided in the posts 34 of the vehicle structure. A slide channel 35 of mohair or other suitable material is arranged between each post channel and the channel 31 of the sash member 33. A bottom channel 36 similar to channels 31 and similarly fastened to the channel 19 is arranged in a channel in the lower part of the sash member, which is positioned just outside of the sill portion 37 of the window frame as shown in Fig. 3.

Secured to the upper edges of the side plates 30, and extending horizontally across the window opening is a sheet metal plate 38, reaching from one side plate 30 to the other. The inner portion of this plate 38 is inclined inwardly and downwardly and is connected by screws 39 to the channel 18 and to flanges on the side plates 30. This inclined portion of the wall 38 is provided with a series of holes 40. Arranged back of the wall 38 are two slidable plates 41, slidably guided in facing channels 42 carried by the wall, and having a series of holes 43 which are adapted to be brought into register with the holes 40 as the plates 41 are moved away from one another to the right and to the left from their positions shown, so that an upwardly directed current of air enters the vehicle at a point a considerable distance inwardly of the window frame, affording ventilation in such direction that it will not strike passengers occupying the seats. This movement of either or both of the plates 41 is obtained by moving a knob or knobs 44 each fixed to one of the plates 41 and projecting through slots 45 in the wall 38.

The sash member 33 extends up to the top of the window frame, its side channels 32 at its upper portions above the plate 38 receiving a U shaped rubber strip 47 which continues along horizontally extending channeled portions 48 of the sash member. A top window pane 52 is held in this rubber strip. The top window pane 52 is thus carried in a substantially vertical plane, while the lower window pane 10 is inwardly offset and generally inclined with respect to the plane of this upper glass. The destination sign box 13 is carried as by means of a hinged support 53 on a part 54 of the car structure so as to be located just inside of the top pane 52 so that the destination indicator itself will be clearly apparent to a person outside the vehicle, through the window pane 52. However, this upper portion of the pane being covered over by the destination sign box is prevented from reflecting any light into the driver's line of vision; and thus it permits of the destination sign being clearly visible from the outside but maintains its non-reflecting function within the space occupied by this upper pane portion 52.

As will now be quite apparent, the entire window sash is adapted for mounting in the two facing vertically extending channels of a vehicle window frame of the conventional construction and may be used in conjunction with a destination sign although the latter of course may be located adjacent some other window of the vehicle if desired. The destination sign, however, when arranged in conjunction with the front side window of the vehicle is conveniently located and does not block any useful area through which vision may be required of the driver as he operates the vehicle.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a vehicle window through which the vehicle driver has vision at a lateral rearward angle, in combination, a glass pane extending upwardly and inwardly at its upper portion, and an upwardly inwardly inclined light shield adjacent the lower portion of the pane and extending across the inner side of the pane and preventing the reflection of light from inside the vehicle into the eyes of the driver in his normal position from the useful vision area of the pane, the end of the shield adjacent the rear end of the pane extending upwardly and substantially transversely toward the rear end of the pane.

2. In a vehicle window through which the vehicle driver has vision at a lateral rearward angle, in combination, a glass pane having a lower portion extending approximately vertically and curving upwardly and inwardly at its upper portion, and an upwardly inwardly inclined light shield adjacent the lower portion of the pane and extending across the inner side of the pane to prevent the reflection of light into the eyes of the driver in his normal position from the useful vision area of the pane, the end of the shield adjacent the rear end of the pane sweeping upwardly and extending substantially transversely toward the rear end of the pane.

3. In a vehicle window through which the vehicle driver has vision at a lateral rearward angle, in combination, a glass pane extending upwardly and inwardly at its upper portion, and an upwardly inwardly inclined light shield adjacent the lower portion of the pane and extending across the inner side of the pane to prevent the reflection of light from inside the vehicle into the driver's eyes from a useful vision area of the pane, the lower end of the light shield being arranged substantially above the bottom of the pane and spaced a substantial distance inwardly of the pane and the forward portion of the light shield inclining generally toward the normal location of the driver's eyes.

4. In a vehicle window through which the vehicle driver has vision at a lateral rearward angle, in combination, a glass pane having a lower portion extending approximately vertically and curving upwardly and inwardly with an upwardly increasing curvature, and an upwardly inwardly inclined light shield adjacent the lower portion of the pane and extending across the inner side of the pane to prevent the reflection of light into the driver's eyes from the useful vision area of the pane, the lower end of the light shield being arranged substantially above the bottom of the pane and spaced a substantial distance inwardly of the pane and the forward portion of the light shield inclining generally toward the normal location of the driver's eyes, the end of the shield adjacent the rear end of the pane extending upwardly and substantially transversely toward the rear end of the pane.

5. In a vehicle having a driver's location at the front of the vehicle, a vehicle window at the right-hand side of the vehicle and near but to the rear of the driver's location and through which the driver has vision at a lateral rearward angle, said window comprising a glass pane curving upwardly and inwardly, and an upwardly and inwardly inclined light shield adjacent the lower portion of the pane and extending across the inner side of the pane, the end of the shield adjacent the rear end of the pane extending upwardly and projecting substantially transversely toward the pane, the angularity and extent of the light shield being so coordinated with the arrangement of the pane and its curvature as to prevent the reflection of light into the driver's eyes from any point of the pane above the level of the bottom of the light shield.

6. In a vehicle, in combination, an upper portion which is inwardly non-light reflecting and which carries a destination sign facing the side of the vehicle, a window glass pane through which the vehicle driver has vision at a lateral rearward angle and extending upwardly and inwardly at its upper portion below said upper portion and destination sign, and an upwardly inwardly inclined light shield located adjacent the lower portion of the pane and extending across the inner side of the pane to prevent the reflection of light into the driver's eyes from a useful vision area of the pane.

7. In a vehicle, in combination, an upper portion which is inwardly non-light reflecting and which carries a destination sign facing the side of the vehicle, a window glass pane through which the vehicle driver has vision at a lateral rearward angle and extending upwardly and inwardly at its upper portion below said upper portion and destination sign, and an upwardly inwardly inclined light shield located adjacent the lower portion of the pane and extending across the inner side of the pane to prevent the reflection of light into the driver's eyes from a useful vision area of the pane, the end of the shield adjacent the rear end of the pane sweeping upwardly and extending substantially transversely to the middle portion of the rear end of the pane.

8. In a vehicle, a sash member adapted for mounting in a window frame, a glass pane through which the vehicle driver has vision at a lateral rearward angle and curving upwardly and inwardly with an upwardly increasing curvature, laterally extending side members projecting from the sash member and supporting said pane, and an upwardly inwardly inclined light shield connected to the side members adjacent the lower portion of the pane and extending across the inner side of the pane and preventing the reflection of light into the driver's eyes from a useful vision area of the pane.

9. In a vehicle, a sash member, a glass pane through which the vehicle driver has vision at a lateral rearward angle and curving upwardly and inwardly with an upwardly increasing curvature, laterally extending side members supporting said pane and carried by the sash member, and an upwardly inwardly inclined light shield carried by the side members adjacent the lower portion of the pane and extending across the inner side of the pane and preventing the reflection of light into the driver's eyes from a useful vision area of the pane, the lower end of the light shield being arranged substantially above the bottom of the pane and spaced a substantial distance inwardly of the pane and the forward portion of the light shield inclining generally toward the normal location of the driver's eyes, the end of the shield adjacent the rear end of the pane extending upwardly and substantially transversely toward the rear end of the pane.

10. In a vehicle, a frame having spaced uprights provided with facing grooves, a window section in the upper portions of said grooves, a holder in the lower portions of said grooves, a lower window section through which the vehicle driver has vision at a lateral rearward angle and comprising a glass pane extending upwardly and inwardly at its upper portion and arranged in said holder and spaced inwardly at the upper end a substantial distance from said upper window section, said holder having an upper portion extending from the top of said pane across to the upper window section to cover a space open to the outside air and provided with ventilation openings, and an upwardly inwardly inclined light shield adjacent the lower portion of the pane and extending across the inner side of the pane to prevent the reflection of light into the driver's eyes from a useful vision area of the pane.

11. In a vehicle, a frame having spaced uprights provided with facing grooves, a window section in the upper portions of said grooves, a holder in the lower portions of said grooves, a lower window section through which the vehicle driver has vision at a lateral rearward angle and comprising a glass pane extending upwardly and inwardly at its upper portion and arranged in said holder said holder having an upper portion extending across from the top of said pane to the upper window section to cover a space open to the outside air and provided with ventilation openings, an upwardly inwardly inclined light shield adjacent the lower portion of the pane and extending across the inner side of the pane to prevent the reflection of light into the driver's eyes from a useful vision area of the pane, the lower end of the light shield being arranged substantially above the bottom of the pane and spaced a substantial distance inwardly of the pane and the forward portion of the light shield inclining generally toward the normal location of the driver's eyes.

12. In a vehicle having a driver's location at the front of the vehicle, a vehicle frame having spaced posts, a channeled sash member arranged in said posts, a holder having laterally extending spaced parallel side plates received at their outer portions in the channels of the sash member, a glass at the right-hand side of the vehicle and near but to the rear of the driver's location and through which the driver has vision at a lateral rearward angle, said glass extending upwardly and inwardly and carried by said holder, said holder having a top portion extending outwardly substantially to the plane between the posts and extending downwardly and inwardly substantially to the top of said glass and provided with ventilation openings, and means operable to control said openings.

13. In a vehicle having a driver's location at the front of the vehicle, a vehicle frame having spaced posts, a sash member in said posts and a holder fixed to the sash member and having laterally extending spaced side plates and having curved facing channels, a glass at the right-hand side of the vehicle and near but to the rear of the driver's location and through which the driver has vision at a lateral rearward angle, said glass extending upwardly and inwardly and carried by said channels, said holder having a top portion extending outwardly substantially to the plane between the posts and extending downwardly and inwardly substantially to the top of said glass to enclose a space open to the outside air and provided with ventilation openings, means operable to control said openings, and an upwardly and inwardly inclined light shield adjacent the lower portion of the pane and extending across the inner side of the pane to prevent the reflection of light into the driver's eyes from the useful vision area of the pane, the end of the shield adjacent the rear end of the pane sweeping upwardly and projecting substantially transversely toward the pane.

14. In a vehicle having a driver's location at the front of the vehicle, a vehicle frame having spaced posts, a sash member in said posts and a holder fixed to the sash member and having laterally extending spaced side plates and having curved facing channels, a glass at the right-hand side of the vehicle and near but to the rear of the driver's location and through which the driver has vision at a lateral rearward angle, said glass extending upwardly and inwardly and carried by said channels, said holder having a top portion extending outwardly substantially to the plane between the posts and extending substantially to the top of said glass, an upwardly and inwardly inclined light shield adjacent the lower portion of the pane and extending across the inner side of the pane to prevent the reflection of light into the driver's eyes from the useful vision area of the pane, the end of the shield adjacent the rear end of the pane sweeping upwardly and projecting substantially transversely toward the pane, and a flat glass mounted in the sash member above the top portion of the holder.

15. In a vehicle, in combination, a window glass pane mounted in the vehicle in position through which the vehicle driver has vision at a lateral rearward angle and extending upwardly and inwardly at its upper portion, an upper portion positioned above said glass pane having a receiving space for a designating sign or the like and preventing reflection of light into the driver's eyes, and an upwardly and inwardly inclined light shield located adjacent the lower portion of the pane and extending across the inner side of the pane to prevent the reflection of light into the driver's eyes from a useful vision area of the pane.

16. In a vehicle, in combination, a window glass pane mounted in the vehicle in position through which the vehicle driver has vision at a lateral rearward angle and extending upwardly and inwardly at its upper portion, a container portion above said glass pane for receiving a designating sign and constructed to prevent reflection of light into the driver's eyes from the zone covered by said container, and an upwardly inwardly inclined light shield located adjacent the lower portion of the pane and extending across the inner side of the pane to prevent the reflection of light into the driver's eyes from a useful vision area of the pane, the end of the shield adjacent the rear end of the pane sweeping upwardly and extending substantially transversely to the middle portion of the rear end of the pane.

17. In a vehicle having a driver's location at the front of the vehicle, a vehicle frame having spaced posts, a channeled sash member arranged in said posts, a holder having laterallly extending spaced parallel side plates received at their outer portions in the channels of the sash member, a glass at the right-hand side of the vehicle and near but to the rear of the driver's location and through which the driver has vision at a lateral rearward angle, said glass extending upwardly and inwardly and carried by said holder, said holder having a top portion extending outwardly substantially to the plane between the posts and extending downwardly and inwardly substantially to the top of said glass to enclose the space open to the atmosphere and provided with ventilation openings, means operable to control said openings, and an upper portion positioned above said holder having a receiving space for a designating sign or the like and preventing reflection of light into the driver's eyes from the zone covered by said upper portion.

WILLIAM T. ROSSELL.
FRANCIS H. SHEPARD.
HARRY J. BADER.